US006421790B1

United States Patent
Fruehling et al.

(10) Patent No.: US 6,421,790 B1
(45) Date of Patent: Jul. 16, 2002

(54) METHOD AND CIRCUIT FOR ANALYSIS OF THE OPERATION OF A MICROCONTROLLER USING SIGNATURE ANALYSIS OF DATA AND INSTRUCTIONS

(75) Inventors: Terry L. Fruehling, Kokomo; James M. Spall, Noblesville; Troy L. Helm, Kokomo, all of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/309,135

(22) Filed: May 10, 1999

(51) Int. Cl.7 ................................. G06F 11/00
(52) U.S. Cl. ..................................... 714/30
(58) Field of Search ................. 714/30, 31, 32, 714/34, 36, 39, 43, 48, 25, 27, 12

(56) References Cited

U.S. PATENT DOCUMENTS

| | | | | |
|---|---|---|---|---|
| 4,503,536 A | * | 3/1985 | Pauzer | 371/25 |
| 5,051,996 A | * | 9/1991 | Bergeson et al. | 371/22.4 |
| 5,617,531 A | * | 4/1997 | Crouch et al. | 395/183.06 |
| 5,732,209 A | * | 3/1998 | Vigil et al. | 395/183.06 |
| 5,745,500 A | * | 4/1998 | Damaria et al. | 371/22.2 |
| 5,790,562 A | * | 8/1998 | Murray et al. | 371/22.4 |
| 5,925,144 A | * | 7/1999 | Sebaa | 714/733 |
| 5,974,529 A | * | 10/1999 | Zumkehr et al. | 712/41 |
| 6,055,661 A | * | 4/2000 | Luk | 714/736 |
| 6,105,154 A | * | 8/2000 | Wang et al. | 714/732 |

* cited by examiner

*Primary Examiner*—Nadeem Iqbal
(74) *Attorney, Agent, or Firm*—Jimmy L. Funke

(57) ABSTRACT

A method and circuit for determining the health of a microcontroller is a bus having a data line and instruction line. A first CPU is coupled to the bus. A reference memory stores a reference signature. A shift register is coupled to the bus and generates a second signature in response to the data line and instruction line. A controller is coupled to the register and the reference memory for controlling reading of the data line and instruction line. The controller compares the reference signature to the second signature. The controller generates a fault signal when the reference signature is unequal to the second signature.

20 Claims, 14 Drawing Sheets

METHOD AND CIRCUIT FOR ANALYSIS OF THE OPERATION OF A MICROCONTROLLER USING SIGNATURE ANALYSIS OF DATA AND INSTRUCTIONS

RELATED APPLICATIONS

The present application is related to copending commonly filed U.S. Patent application entitled "Method and Circuit for Analysis of the Operation of a Microcontroller Using Signature Analysis of Memory", Serial Number (Attorney Docket H204283) and U.S. Patent application entitled "Method and Circuit for Analysis of the Operation of a Microcontroller Using Signature Analysis During Operation" Serial Number (Attorney Docket H205487) both filed simultaneously herewith and both of which are hereby incorporated by reference.

TECHNICAL FIELD

The present invention relates generally to microcontrollers. More specifically, the present invention relates to a method for verifying the proper operation of a microprocessor-based control module.

BACKGROUND OF THE INVENTION

The use of electronics in automobiles is continually increasing. Many electronic applications include a microcontroller unit (MCU) that is comprised of a central processing unit (CPU) and associated peripheral devices. The peripheral devices may be specific or customized to the controller application. These can include communication devices such as serial peripheral interfaces, memory devices such as RAM, ROM/FLASH and EEPROM, timers, power supplies, A/D converters and other devices, either built on the same integrated circuit or as separated devices. The CPU and its peripheral devices are linked together by a communications bus.

An MCU dedicated to the control of one subsystem (such as anti-lock brakes-ABS) is said to be embedded in that subsystem. When the MCU is part of an application Electronic Control Unit (such as an ABS ECU) which contains interface circuits for example, to aid in the collection of data or support high current drive requirements, the combination may be referred to as an embedded controller. The method as described, is not limited in use to embedded controllers.

MCUs typically include self-tests to verify the proper operation of the CPU and the associated peripheral devices. The self-test will detect illegal memory access decoding, illegal opcode execution or a simple Watchdog/Computer operating properly (COP) test. More fault coverage than this is required for a mission critical system. In a mission critical system, the correct operation of the CPU and the MCU's peripherals (such as timer module, A/D converters, and Communication Modules, etc.) that comprise the MCU is important for the satisfactory operation of the vehicle. Correct operation of the MCU must be established during the initialization phase following. power on, and during repetitive execution of the control program.

Allowing the device under test (such as the CPU) to test itself is a questionable practice. Test methods that are implemented so that execution occurs as the application algorithm is running will be referred to as "On-Line" or "concurrent" testing. Further, "Off-Line" testing will reference the condition when the device is placed in a special mode in which the execution of the application algorithm is inhibited. Off-line testing is used for manufacturing test or for special purpose test tools, such as that a technician might use in the field to run unique diagnostic tests. On-line, concurrent testing using redundant software techniques is throughput Consuming. The ability of the CPU to test it's own instruction set with a practical number of test vectors is limited at best.

Tens of thousands of test vectors are generated for manufacturing tests are required to establish a 99% fault detection level for complex microcontrollers. Writing routines to test the ability of a CPU to execute various instructions by using sample data and the instruction under-test that will be used in the application is practically futile.

Even if a separate "Test ROM" was included in the system to either:
1. Generate a special set of inputs and monitor the capability of the CPU and application algorithm or a test algorithm to properly respond.
2. Generate and inject test vectors derived from manufacturing fault detection testing and then evaluate the capability of the CPU to properly process, and produce the correct resultant data at circuit specific observation points.

In a complex system a test ROM would become inordinately large in order to guide the CPU through a limited number of paths or "threads" of the application algorithm. The data used must be carefully selected and necessitates detailed knowledge of the MCU by the test designer. MCU suppliers rarely supply sufficient information to allow effective design. Thus the first test ROM method would be contrived and limited in its ability to simulate an actual operating environment. If the second technique were employed, and unless all of the manufacturing test vectors were used, the resulting tests would be partial and lengthy. If an attempt were made to isolate the portion of the system that was used and then target it with the proper vectors (to reduce the overall vector quantity), every time the algorithm changed the subset of vectors would be subject to further scrutiny, and possible modification. The technique would have further implementation difficulties for continuous validation of the system in a dynamic run mode of operation. The technique does not consider the concept of monitoring a system based on execution "Dwell Time" in any particular software module or application "Run Time Mode" condition.

Modifying the CPU to have built in-self test, such as parity to cover the instruction set look up table, duplication or Total Self Check (TSC) circuit designs, etc., of subcomponents of the CPU, may result in a significant design modification to a basic cell design. CPU designers are reluctant to modify proven designs for limited applications.

Software techniques that involve time redundancy, such as calculating the same parameter twice, via different algorithms, also require that multiple variables be used and assigned to different RAM variables and internal CPU special function registers. Thus time redundancy also requires hardware resource redundancy to be effective. Because of the substantial amount of CPU execution time needed for redundancy, the CPU requires excess capacity to accomplish the redundant calculations in a real time control application. Because of the added complexity necessary for this implementation of redundancy, the verification process is commonly long and lengthy.

The process of requiring the CPU to perform the self-test is time consuming and inadequate, especially in applications having a relatively large memory and with many peripheral devices. To date, the most direct way to solve this problem has been to simply place two microcontrollers into the system. In such systems, each microcontroller is the compliment of the other and each memory and peripheral module are duplicated. Both devices then execute the same code in near lock step. The technique is effective because it checks the operation of one microcontroller against the other. Although the system tests are performed with varied threads through the algorithm, variable dwell in any portion of the application, and with the random-like data that occurs in the actual application environment, the following must be considered:

1. Data faults or hardware faults that may occur, are used to calculate system parameters. In a dual microcontroller system these parameters may be filtered before they are compared by the second microcontroller. Thus parametric faults are "second order" to the data or hardware faults that initially created them.
2. Parameters have to be carefully checked against tolerance ranges.
3. The number of times that a miscompare between the two devices actually occurs before a fault is actually logged and responded to must be established.
4. The fail-safe software is not independent from the application algorithm.

As adding parameters modifies the application algorithm, fail-safe software alterations must also be evaluated.

This technique is not an efficient form of resource allocation. Two identical, fully equipped, microcontrollers doing the same task is expensive. Also, extensive communication software is used to synchronize the data between the two microcontrollers.

Other dual microprocessor systems may use a smaller secondary processor to do a limited check of a few portions of the algorithm, or to accomplish a control flow analysis of the main controller to validate its execution from one module to the next or its ability to transfer to and return from subroutines. These schemes are inherently limited and can only detect a small subset of all possible system faults.

A common technique for verifying the operation of a MCU memory peripheral is to use a check sum. A check sum arithmetically sums the bits of a block of memory. The check sum is then compared to a reference value for that particular time for that block of memory in the operation of the CPU. One disadvantage of check sums is that if two opposing bits of the memory are flipped to the opposite state then the checksum will continue to be proper. This is referred to as aliasing. This technique is also slow, and the memory may not be validated within the time response of the system.

Another technique for verifying the operation MCU memory peripherals is to use parity. Single bit parity is faster than the checksum method described above, and synchronizes the memory validation with its use in the execution of the application algorithm. It will also however require the memory array design to be modified and it will require decoding by special hardware. The consequences of a parity fault must be processed by the CPU. Single bit parity is also insensitive to double bit flips in a data byte, The failure to correctly detect data faults is known as aliasing.

To circumvent the problem of adding special hardware to the CPU or software to the application, multiple bit parity schemes and standalone Error Detect and Correct (EDC) processors have been developed. The problem of modifying the memory array to include the extra parity bits still exists. In a typical application, 6 bits may be added to a 16-bit word. Using Hamming Codes, this technique can detect and correct single bit errors, detect but not correct all double bit errors, and detect some triple bit errors.

In the automotive market, check bits added to each word of a memory array is considered an excessive cost burden. The circuits involved are complex, and will add significant cost, but these systems can be integrated into the MCU bus architecture. The draw back to this scheme is that it is intrusive. All data must first be channeled though this device for processing before it is sent to the CPU, adding a delay to the system on every memory read.

There still exists a small amount of configuration software needed to run these devices. If a two or three bit error is detected in the data, an interrupt must be handled to alert the CPU that the affected data is not valid.

Finally, these systems target memory only. The device described in this patent will significantly reduce the possibility of aliasing. Further, the device and method described in this patent will process and detect faults in the CPU instruction streams. The device as described, can ensure that select software modules are processed by the CPU the same way each time they are executed. In this fashion fault detection coverage is added to the memory and the CPU in a single, non-intrusive, cost effective module.

It would be advantageous to verify the MCU memory in automotive applications at startup initialization and during operation of the vehicle. However, to verify that the memory is functioning properly using either the constant checksum or dual microcontrollers with synchronization and data communications software/parameter validation, may place such a burden on the CPU as to slow its operation so that it will not function as required. An alternative may require upgrading the CPU system capacity to re-gain the appropriate throughput. Providing additional capacity increases system cost.

As mentioned before, providing a second Microcontroller operating in parallel with the first is not very cost effective. This led to the development of a dual CPU system incorporated into a single microcontroller unit (MCU). In such a system each CPU operates from a common memory. The main function is to compare the operation of the extra CPU with the primary CPU in a functional comparison module. Only the step by step code execution of the dual CPUs is compared as the two devices execute out of the same memory. If the data from the memory is corrupt, it will be discovered at a later step in the validation process. To ensure that the CPUs are healthy, both CPUs must respond to the same data in exactly the same way. The dual CPU system employs continuous cross-functional testing of the two CPUs as multiple paths are taken through the application algorithm. If the system dwells in one software module or mode disproportionatly to others, the testing is similarly proportionate. Further, the random-like parameter data is "operated on" by the algorithm and any inappropriate interaction with the current instruction data stream is detected. This technique is effective for all environmental conditions such as temperature, voltage, or Electro-Magnetic Interference (EMI).

In essence the actual algorithm and data execution become the test vectors used to ensure "critical functionality" of the system. This is a corollary to common test methods that are designed to detect "critical faults". The system tests only those resources the software application algorithm utilizes, and does not spend any time testing unused portions of the MCU system. If the algorithm is modified to use a previously unused set of available instructions (such as a possible fuzzy logic instructions set), or new operational modes are added (such as ABS Adaptive Braking or Vehicle Yaw Control), modification of the system is not required.

The dual CPU fail-safe system architecture is inherently independent of the application algorithm. Also, the primary design intent of a dual CPU system is to respond to a fault on its first occurrence.

Another disadvantage of previously known verification methods is that the increased complexity of both hardware and software results in degraded reliability of dual MCU systems. Further, increased care must also be taken to reduce EMI susceptibility.

In dual CPU concept, successful testing of peripheral modules by the main CPU is predicated on its correct state of health (the ability of the CPU to execute the algorithm as intended), and the "Built In Self Test" (BIST) circuits incorporated into the MCU peripheral modules. The job of the secondary CPU/Functional Compare Module is to guarantee the correct state of health of the main CPU. Then, as secondary step, the Main CPU methodically tests all subordinate peripherals by exercising or polling their unique BIST circuits.

This sequential scheme of first validating the CPU and then the MCU peripheral modules can be considered as a "bootstrap" validation system. Because of the sequential nature of the bootstrap method and since this scheme is run at the initialization phase and during repetitive execution of the control program, the speed at which the CPU can detect faults in MCU support peripherals is essential. It is therefore advantageous to the execution speed of this method to incorporate peripheral BIST circuits that are independent of, and require minimal interaction with the CPU.

SUMMARY OF THE INVENTION

It is therefore one object of the invention to provide a microcontroller unit capable of self testing in a time efficient manner.

Since a dual CPU system has a limited ability to detect corrupt data streams, a further object of this invention is to ensure that whenever possible, the data streams that the CPUs operate on are not corrupt. Further, the present invention eliminates the secondary step regarding memory peripheral validation (checksums), in the bootstrap process. Hence throughput capacity is returned to the CPU.

In one aspect of the invention, a circuit for determining the health of a microcontroller is provided having a circuit that includes a data line and instruction line. A first CPU is coupled to the bus. A reference memory stores a reference signature. A shift register is coupled to the bus and generates a second signature in response to the data line and instruction line. A controller is coupled to the register and the reference memory for controlling reading of the data line and instruction line. The controller compares the reference signature to the second signature. The controller generates a fault signal when the reference signature is unequal to the second signature.

In a further aspect of the invention, a method of validating the memory of a microcontroller unit comprises the steps of: obtaining a reference signature; reading the contents of a memory block; generating a second signature in response to contents of the memory block; comparing the reference signature to the second signature to obtain a comparison; and, indicating a fault in response to the comparison.

One advantage of the invention is that by using the circuit and method of the present invention faults in the microcontroller may be more readily determined.

Another advantage of the invention is that the implementation of the apparatus can be incorporated into the die. It is estimated that the present invention may be implemented into approximately 0.1% of the overall die area. A further advantage is that the circuit has minimal impact on CPU throughput and thus is very resource effective.

As will be shown in the following description, there are some modes in which the invented apparatus operates with total independence of the "state of health" of even the Dual CPU/Functional Compare System. Another advantage of this invention is that the speed at which corrupt data is detected is several orders of magnitude faster than the response time of an automotive vehicle.

These and other features and advantages of the present invention will become apparent from the following description of the invention, when viewed in accordance with the accompanying drawings and appended claims.

DETAILED DESCRIPTION OF THE PREFERRED EMBODIMENT

Although the invention is described and illustrated in terms of several particular embodiments, the teachings of the present invention may be modified for other system fault analysis. The present invention is particularly suitable for use in automotive applications such as anit-lock braking systems, airbag systems, steering modules and "X-by-wire" applications. "X-by-Wire" Systems include steer by wire, brake by wire, electronic throttle control and electronic airbag deployment. "X-by-Wire" systems due to their importance to vehicle operation will depend on system verification. Other automotive applications include collision avoidance systems and adaptive cruise control. The present invention may be used for other applications outside the automotive realm. Examples include the medical field in such devices as pacemakers, heart-lung machines, and aviation electronics.

The present invention is described with respect to a dual CPU system. The general teachings set forth herein apply equally to single CPU systems. Further, the present invention may be used together with a particular microprocessor circuit or as a stand-alone module suitable for use without alteration to various microprocessors.

Figure 1:
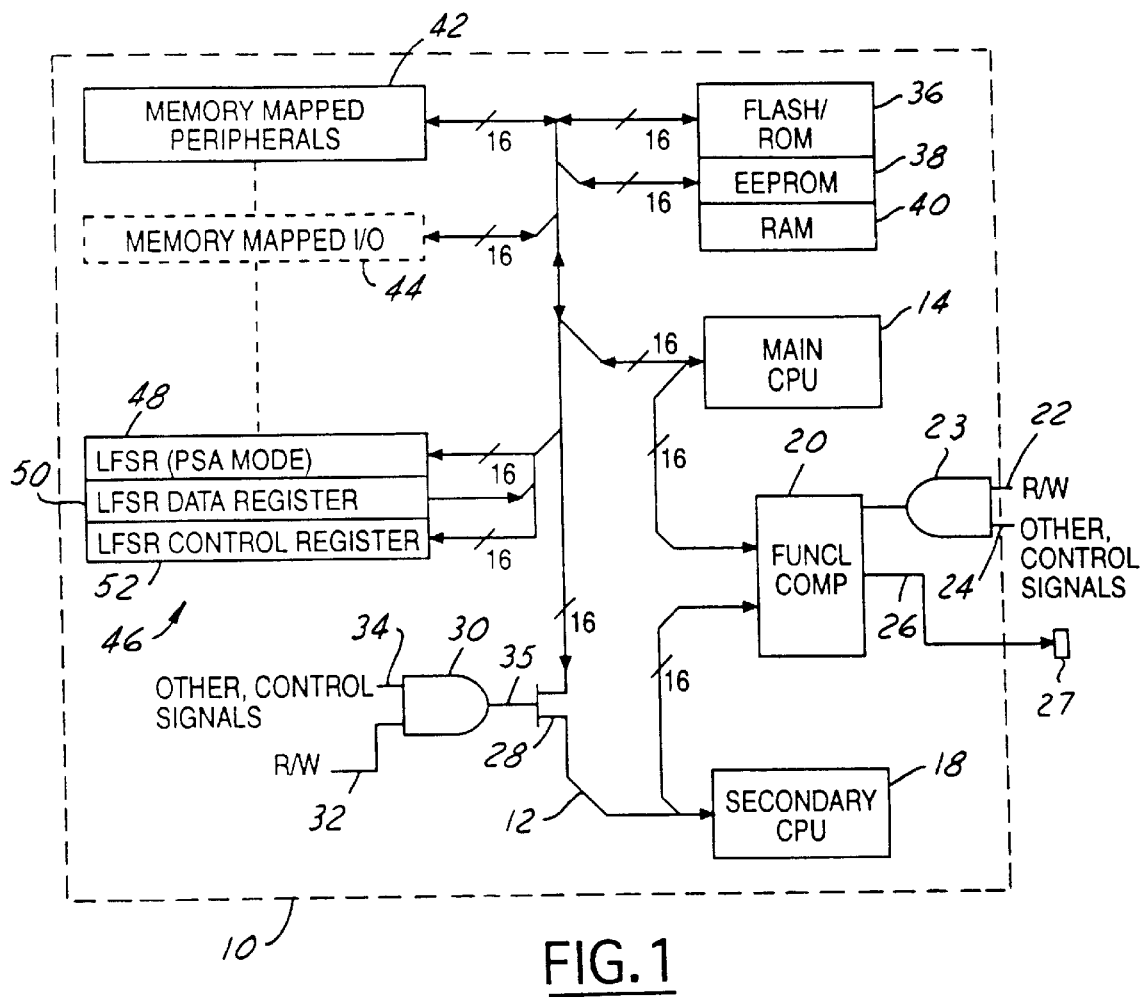
FIG. 1 is a functional diagrammatic view of an analysis circuit according to the present invention.

Referring now to FIG. 1, a microcontroller unit (MCU) 10 is shown having a bus 12 coupling together various electronic components. Bus 12 is illustrated is a data bus. Those skilled in the art would recognize that bus 12 may also comprise a control bus and an address. The control bus operates the timing and control of the various system module peripherals such as enable/disable functions. The read/write control line regulates direction of data flow to or from a peripheral device. Other control signals control handshaking in the communication between modules. Examples of handshaking include DMA Request/DMA Grant, Bus Request/Bus access grant, CPU Idle Bus, external interrupt, interrupt request/grant, Data/Address Valid, and instruction/data fetch.

The address bus carries the address locations of the system memory and peripherals as might be directed or requested by the CPU or any peripheral that needs to drive the MCU system bus.

The data bus transmits data. This data can be either instruction opcode/operand data or external data as might be collected from a peripheral sensor and converted by and A/D converter, or digitized Wheel-speed information.

Microcontroller unit 10 has a main CPU 14 and may also have a secondary CPU 18. A system having a main CPU and a secondary CPU may be referred to as a dual CPU system. Secondary CPU 18 is used to verify the operation of main CPU 14. For many applications, secondary CPU 18 may be eliminated. To perform verification, a functional comparator 20 is used to compare the outputs of main CPU 14 and secondary CPU 18. All of the address and data lines, as well as, selected control lines may be compared. Comparisons are made during write cycles and when the CPU drives the address/data/control bus. Functional comparator 20, may use control outputs such as a read/write output 22 or other control signals 24 to synchronize and manipulate the proper compare function between the two CPUs 14, 18. It is important that the functional comparator does not compare the signals generated by other modules when the CPU is not driving the bus. The output of functional comparator 20 is error indicator 26.

Error indicator 26 may be an output pin 27 of microcontroller 10. The error indicator pine has the drive capability to disable external functions such as motor/solenoid drivers and system power relays. The goal of pin 27 is to disable the system if a fault occurs. If an external pin is not used, then the software system may use a CPU fault (CPUFLT) flag to determine the presence of a fault. A separation gate 28 may be used to separate main CPU 14 and secondary CPU 18. Thus, secondary CPU 18 is transparent to main CPU 14 and does not interact therewith.

Separation gate 28 may have an AND gate 30 used to couple various signals to separation gate 28. AND gate 30 may, for example, have a read write input 32 and control signals input 34. The configuration shown may be used for various microcontroller units and, therefore, the signal inputs 32, 34 may vary depending on the particular function of microcontroller unit 10.

It should be noted that the data bus is used for illustration purposes only. This mechanization is typical for the address bus. Control signals generated by the secondary CPU would go directly to functional comparator 20. Gate 30 and its associated control signals on inputs 32, 34 ensure that the secondary CPU 18 gets all the same inputs as the main CPU 14, but output of secondary CPU 18 only gets routed to functional comparator 20. Output 35 of gate 30 ensures that the functional comparator 20 only compares on write cycles and only when the CPU drives the bus. This logic ensures that functional comparator 20 only examines the correlation between the control signals generated by both the main CPU 14 and secondary CPU 18.

Microcontroller unit 10 may also have a flash/ROM memory 36, an EEPROM memory 38, or a RAM memory 40 coupled to bus 12. Each of the types of memories has various numbers of registers that are addressed. The various types of memories associated with bus 12 will vary depending on the application for microcontroller unit 10.

Memory mapped peripherals 42, although shown as an internal part of the MCU system 10, may also be externally located to the MCU but inside the electronic control unit, and still be coupled to bus 12. When the embedded MCU allows external peripheral connections to directly access the bus 12, it is considered to be in an "expanded" mode of operation. This condition does not occur frequently in the production of embedded controllers, where peripheral integration into the MCU system is a desired cost-reducing objective. However, when this does occur, such conditions would be included in the coverage of the apparatus described in this patent.

Memory mapped peripherals 42, such as serial communication peripherals or automotive class II communication links (single wire J1850) may be coupled to bus 12. Further, general purpose timers such as pulse width modulation module, general purpose inputs such as A/D converters and input capture modules, application specific modules such as the Adaptive Braking System (ABS) Wheel Speed Integration (WSI) Module or the Magnetic Variable Steering Assist (MSVA) Current Control Module (CCM) may also be coupled to bus 12.

Optionally, memory mapped I/O devices 44 such as configurable I/O ports, pulse receiver modules (programmable Schmidt trigger inputs), or relay or lamp line driver modules may be coupled to bus 12.

Microcontroller unit 10 has a built in self-test module (BIST) 46 coupled to bus 12. BIST 46 as will be further described below is used as a real time parallel signature analyzer (PSA) for analyzing various aspects of microcontroller unit 10. For example, memory, 36, 38, and 40, may be analyzed by BIST 46. BIST 46 may be used to validate other operational aspects of microcontroller unit 10 such as signaturing any type of data streams, and signaturing instruction streams. BIST 46 may be memory mapped onto bus 12 and, therefore, has minimal design impact on MCU 10. By memory mapping BIST 46, it acts as any other peripheral. BIST 46, if truly built-in, requires silicon space and requires decoding of the devices internal registers to MCU 10. Signaturing various aspects of the operation of MCU 10 may take place in various modes of operation. For example, in totally autonomous mode, "background" mode no CPU/Software intervention is required. The apparatus maintains its functionality independent of the state of health of the CPU.

In a semi-autonomous mode, "foreground" mode, the apparatus is under direct but limited CPU/Software control. This mode is used to accomplish block validation of data streams, or to use a sectored approach to validate MCU/Peripheral configuration (status or control) registers. This method will be used to also accommodate any noncontiguous memory array.

In a non-autonomous mode (under direct and continuous CPU/Software control), automotive tech tools interface is supported, so that the device, which has this feature, can be diagnosed on the vehicle. The unit can operate under remote command of such a tool, to run user selected tests.

Finally, in all modes described above, the apparatus allows internal registers to be interrogated via a communications port.

BIST 46 is comprised of a register such as a linear feedback shift register (LFSR) 48. As will be further described below, LFSR 48 is coupled in parallel to bus 12. However, one skilled in the art would recognize that LFSR 48 may also be coupled serially to bus 12 without deviating from the scope of the invention. Further, a microprocessor could be programmed to collect data from the bus and perform the polynomial division accomplished by register 48. LFSR 48 may also have an LFSR data register 50, and a controller such as an LFSR control register 52 associated therewith. As illustrated above, the LFSR system may be incorporated into MCU 10.

Figure 2:
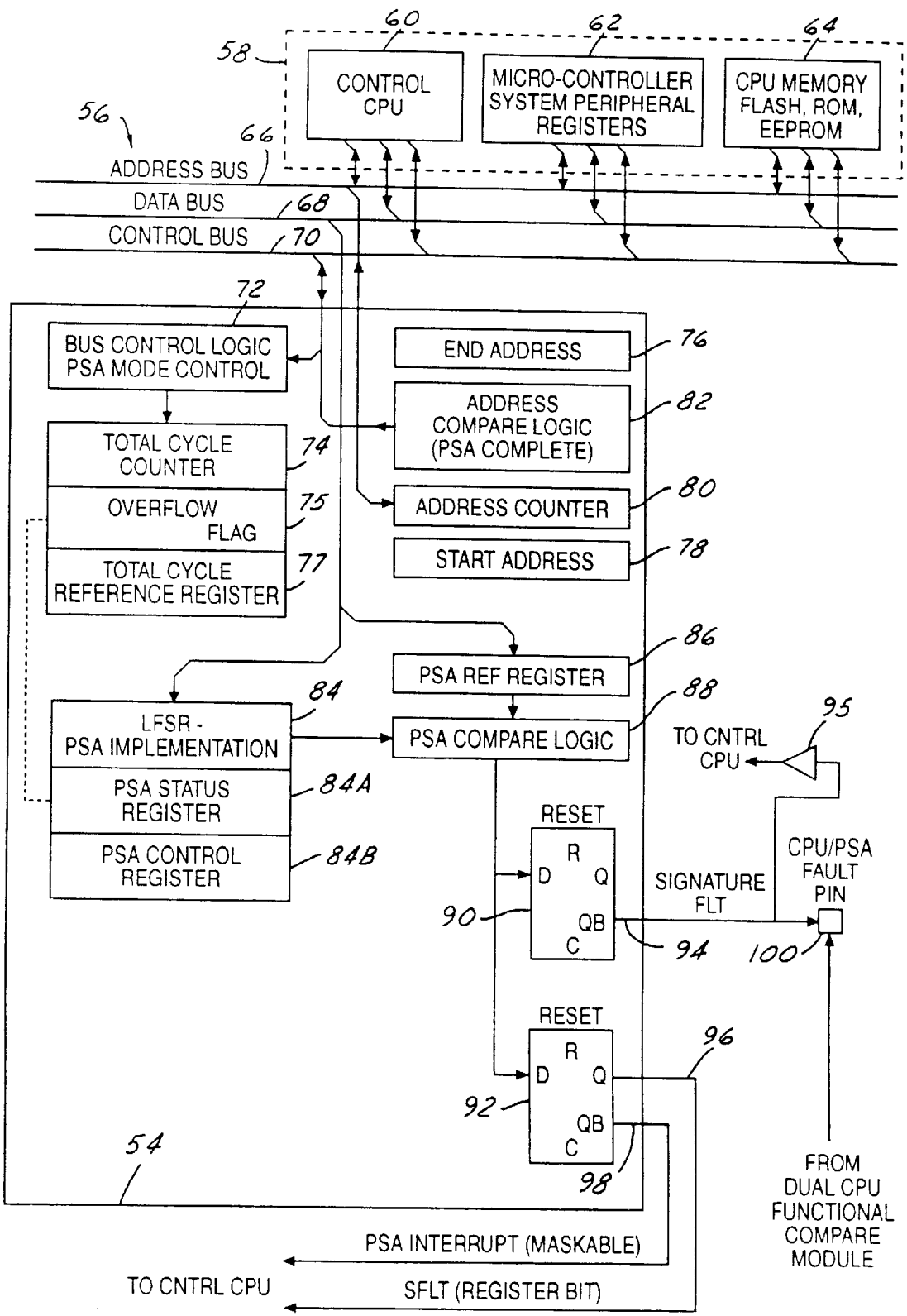
FIG. 2 is a functional diagrammatic view of a stand-alone analysis circuit according to the present invention.

Referring now to FIG. 2, a parallel signature analyzer (PSA) may be incorporated into a stand-alone module 54. Stand alone module 54 may be coupled to a bus 56 of various microcontroller units. In this example, a microcontroller unit 58 has a control CPU 60, an assortment of microcontroller system peripheral registers 62 associated with memory-mapped peripherals, and CPU memory 64. Bus 56 may comprise an address bus 66, a data bus 68, and a control bus 70. As one skilled in the art would recognize, a second CPU may also be incorporated into the system as described above with FIG. 1. Each of control CPU 60, peripheral register 62, and CPU memory 64 may be coupled to address bus 66, data bus 68, and control bus 70.

Within stand-alone module 54, a bus control logic circuit 72 is coupled to control bus 70. Bus control logic circuit 72 acts as a controller to control the operation of stand-alone module 54 for parallel signature analysis as will be further described below. A total cycle counter 74 with an overflow flag 75 may be coupled to bus control logic circuit 72 to count total cycles for some implementations of stand-alone module 54. A total cycle reference register 77 may also be coupled to total cycle counter 74.

Various registers for holding data may be incorporated into stand-alone module 54. For example, an end address register 76 and a start address register 78 may be used to store the start address and end addresses of the memory within memory 64 to be checked. If the system is used for signaturing data or instructions streams, the registers may be used to store the start and end of the data or instructions to be signatured. An address counter 80 is used to count/increment and automatically point to the address locations between start address 78 and end address register 76. An address compare logic circuit 82 is used to determine when the end address from end address register 76 is reached.

LSFR 84 is generally known in the art. LSFR 84 is a parallel shift register that requires one clock pulse to load all registers. LFSR 84 is shown coupled to data bus 68. LFSR 84 may, however, be coupled to address bus 66 and control bus 70. A reference register 86 and a compare logic circuit 88 may also be coupled together and to LFSR 84. LFSR 84, reference register 86, and compare logic 88, as will be further described below, generates a signature and compares the signature to a reference signature stored in reference register 86. LFSR 84 generates a signature representative of the operation to be checked. For example, if the contents of memory 64 are to be checked, LFSR 84 generates a signature representative of the memory contents. If a comparison is made that is not proper, compare logic 88 is coupled to output flip flops 90 and 92. Flip flops 90, 92 may also be coupled to the overflow flag of the total cycle counter (illustrated below in FIG. 5). Flip flops 90, 92 may be latched and edge triggered, respectively. First output flip flop 90 may have a signature fault output 94 that indicates that the status of the comparison is not proper. Output flip flop 92 may provide output to the control CPU 60 through a buffer 95 (if required) such as a register bit signature fault output 96 and a PSA interrupt output 98. Signature fault output 94 may be coupled to an external fault pin 100 or other indicator of a fault.

LFSR 84 may have a status register 84A and a control register 84B. The operation of these registers will be further described below.

Figure 3:
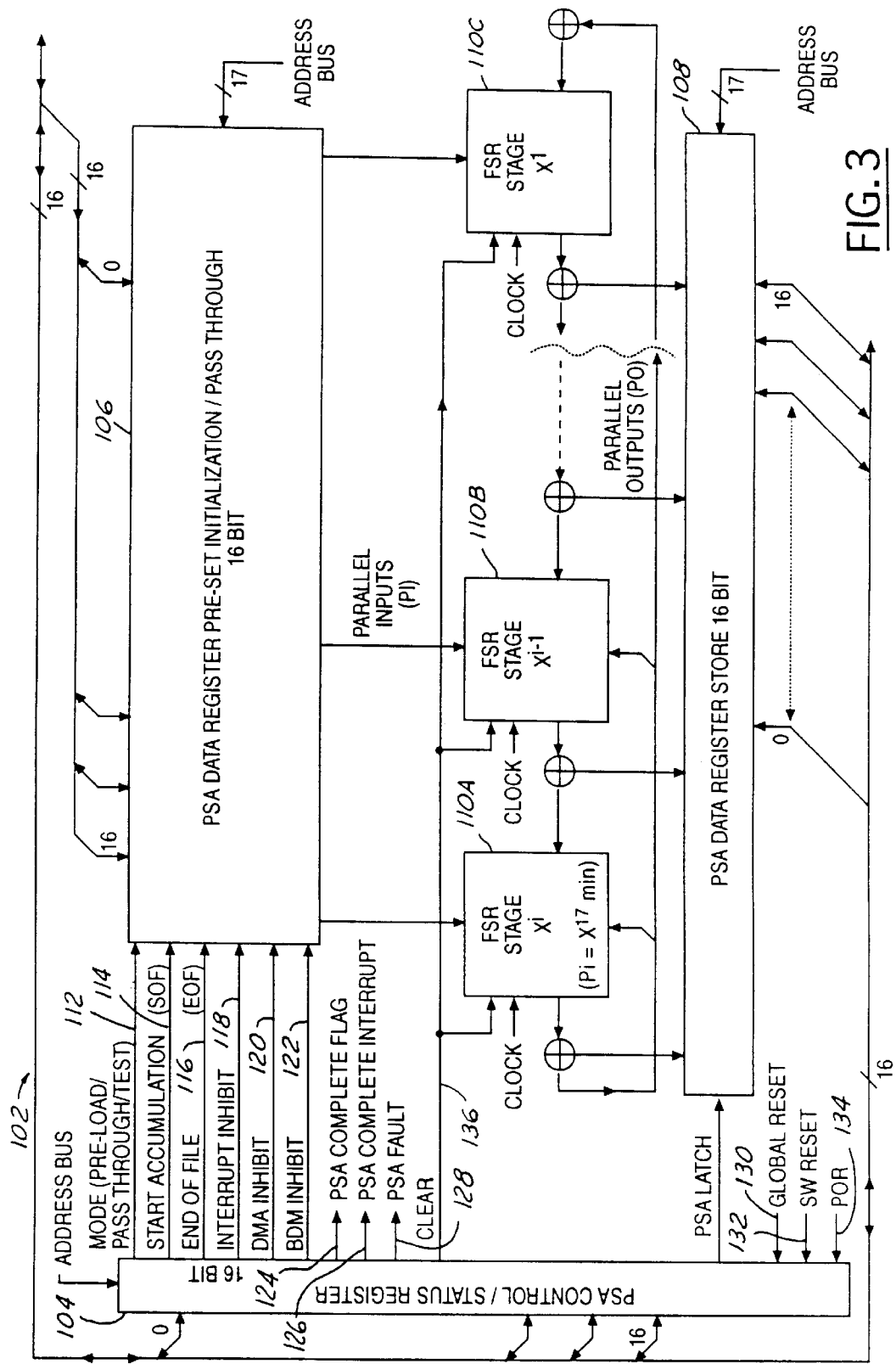
FIG. 3 is a functional diagrammatic view of the linear feedback shift register according to the present invention.

Referring now to FIG. 3, a suitable LFSR circuit 102 is illustrated. LFSR circuit 102 is an expanded view of LFSR 84 of FIG. 2. LFSR 84 has a status and control registers 104, a data register 106, and a register store 108. Status register 104, data register 106, and register store 108 are illustrated coupled to data bus 68. However, each may be coupled to other buses such as address bus 66 and control bus 70. Also, control register is illustrated as a single component. In an actual implementation status and control register is likely to be two separate items.

LFSR circuit 102 has a plurality of feedback shift register stages $110_a$, $110_b$ through $110_i$. The number of stages 110 corresponds to the number of simultaneous bits to be checked and the rollover period of the divisor polynomial implemented by the LFSR design. Stage $110a$ is shown as example only as the minimum "order" of the polynomial required to have the range to signature $128k$ of memory or other data or instructions to be signatured. In practice for the multiplicity of uses of this invention, the order may be higher to ensure aliasing does not occur. The present invention may signature instruction stream data as well as sensor input and all forms of memory data. In the event that the data stream has exceeded the period of the polynomial, an overflow flag is used to indicate that aliasing may have occurred.

LFSR circuit 102 is illustrated having various control lines or outputs suitable for foreground mode. However, the circuit may be easily modified to accomplish a background implementation as will be particularly evident after reading the methods for operation below. Control register 104 has a plurality of outputs such as a mode output 112, a start accumulation output 114, an end of file output 116, an interrupt inhibit output 118, a DMA inhibit output 120, and a BDM inhibit output 122. Mode output 112 sets a preload (if required), pass through, or test mode for data register 106. Start accumulation output 114 triggers the accumulation of data by data register 106. End of file output 116 indicates to data register 106 that the end of file is reached and to stop accumulating data. Interrupt inhibit 118 prevents an interrupt from a CPU from interfering with the operation of the LFSR. DMA inhibit output 120 prevents direct memory access by CPU to memory registers being checked. BDM inhibit outputs 122 prevent background debug mode data from being accumulated by LFSR. Other outputs may include a complete flag output 124, a PSA complete interrupt 126, and a PSA fault output 128. Complete flag output 124 indicates to a CPU that signaturing is complete. PSA complete interrupt indicates that signature analysis is complete. This signal allows further diagnostics as will be further described below. Fault output 128 indicates a fault occurred during signature analysis and may be used to drive flip flops 90, 92 of FIG. 2.

Inputs to PSA control/status register include a global reset 130, a software (SW) reset 132, and a power on reset (POR) 134. Global reset 130 is a hardware reset condition that puts all the MCU peripheral configuration and status registers (I/O control, PWM, Communications, System timers, Current Control Module, Power Supplies, and the General Purpose PSA module) to a known state. This could be initiated by software decision module or by hardware module based on input thresholds. Software Reset 132 is a reset of the configuration, status, or control registers of a particular peripheral. Power on Reset 134 is a global reset that puts all MCU modules to a known state at power-up or ignition.

Control/status register 104 may also have a clear output 136 coupled to each stage 110$_a$ to 110$_i$ to reset the contents of each FSR stage.

In general, data register 106 is used to load in a value into LFSR. In pass through mode, the contents of feedback shift register stages 110 through 110$_i$ are presumed to have been cleared to a desired starting value. Values from FSR stages 110 through 110$_i$ are loaded into data register store 108.

Figure 4:
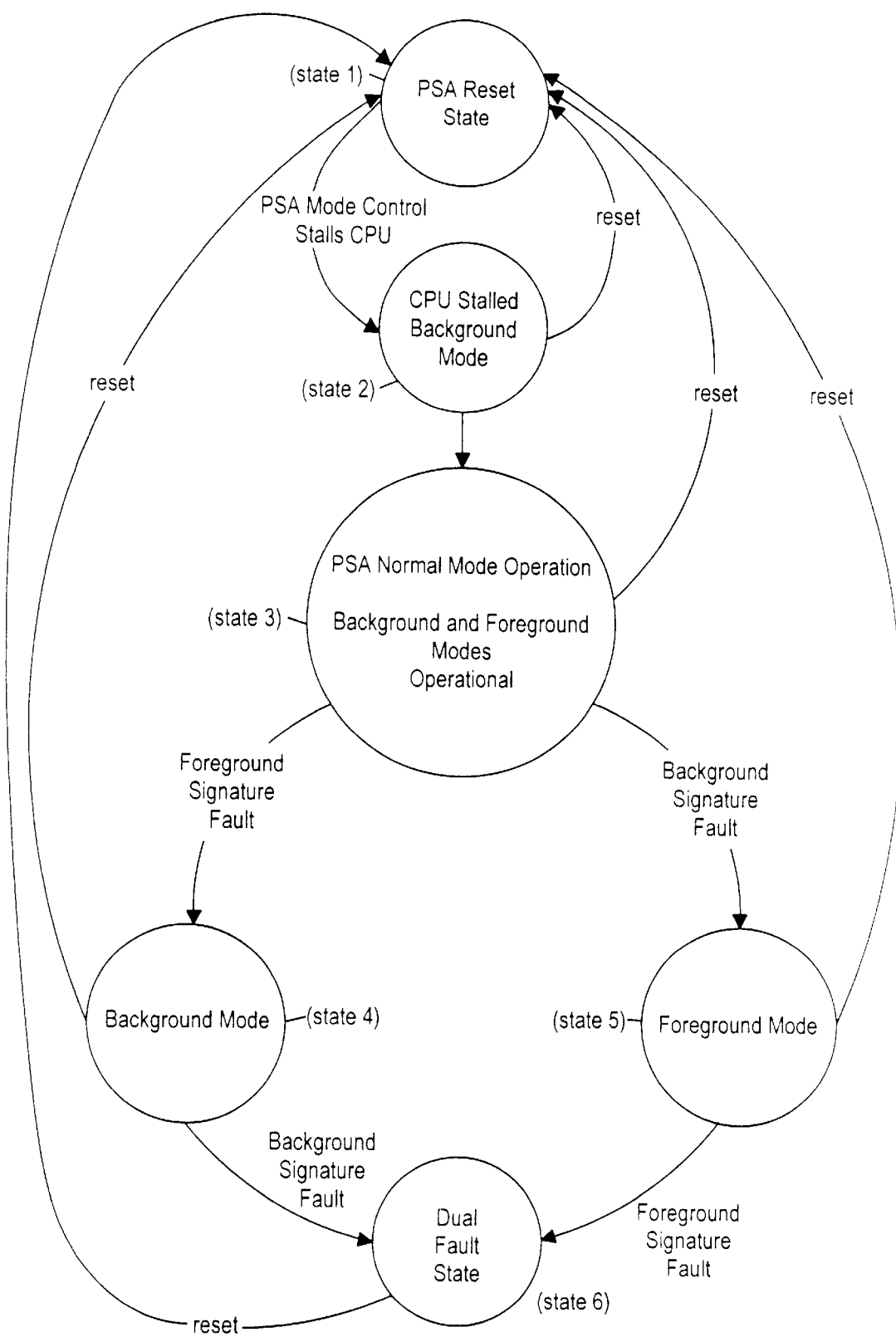
FIG. 4 is a state diagram of the operation of a system according to the present invention.

Referring now to FIG. 4, the general operation of the system may be illustrated by the following state diagram 400. In state 1, the PSA is at a reset state. If any hardware or software reset is generated in the following states, the PSA module returns to the reset state (state 1). The second state is achieved when the PSA mode controls the CPU. When the CPU is stalled, the CPU is in background mode. State 2 is used in a high speed accumulation of memory and background mode. Although it may be used for other purposes, however, background mode is least intrusive for high speed accumulation of memory. In state 2, if PSA is reset, state 1 is again accomplished. If in state 2, high speed background mode has been completed, the CPU may be stalled and the state released to state 3. In state 3, the PSA normal mode of operation is attained. In state 3, if the foreground signature fault is achieved, state 4 is performed and only background mode is operational. In state 3, if a background signature fault is achieved, only foreground mode is operational in state 5. In state 4, the PSA Mode Controller may steal a bus cycle or use idle bus cycles if available. In state 5, the PSA module monitors the bus only when the CPU is driving the bus. In both states 4 and 5, if a reset occurs, state 1 is again executed.

An additional state, state 6, may be employed. State 6 is a dual fault state. In state 5 if there is a foreground signature fault dual fault state 6 is entered. In background mode if a background signature fault is entered the dual fault state, state 6 may also be entered. From the dual fault state, state 6, upon recess state 1 may be executed.

Figure 5:
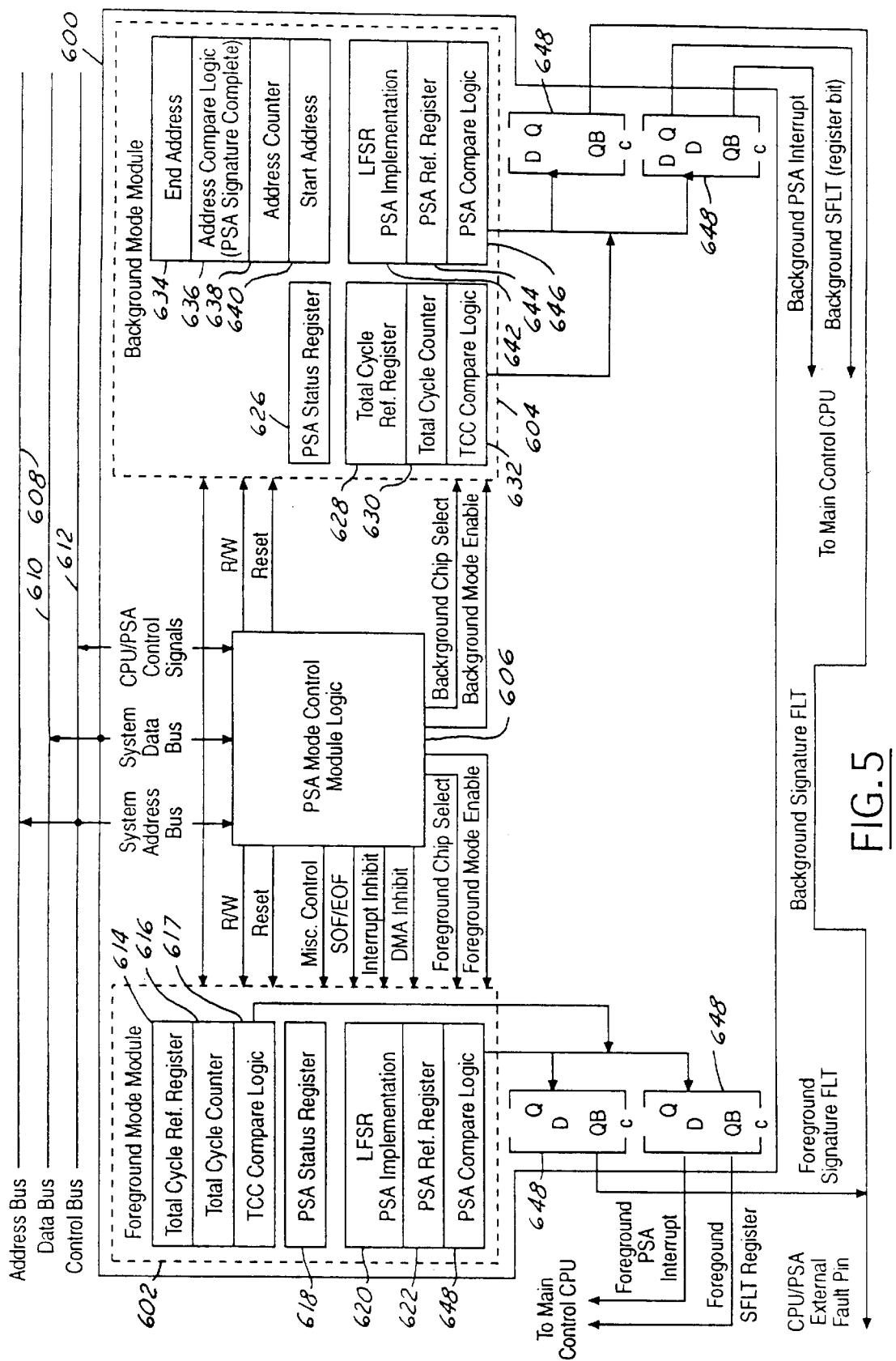
FIG. 5 is a functional diagrammatic view of an analysis circuit having background and a foreground mode according to the present invention.

Referring now to FIG. 5, an alternative LFSR circuit 600 may include a foreground mode module 602, a background mode module 604, and a PSA mode control logic circuit 606. This will allow the LFSR circuit 600 to operate both foreground and background modes. The PSA control module logic circuit 606 is coupled to address bus 608, a data bus 610 and a control bus 612.

Foreground mode module 602 has a total cycle reference register 614, a total cycle counter 616 and a total cycle compare logic circuit 617. A PSA status register 618, an LFSR PSA implementation 620, a PSA reference register 622 and a PSA compare logic circuit 648 may also be included in foreground mode module 602. The foreground mode module 602 functions similarly to that shown above.

Background mode module 604 has a PSA status register 626, a total cycle reference register 628, a total cycle counter 630 and a total cycle compare logic circuit 632. Background mode module 604 also has an end address register 634, an address compare logic circuit 636, an address counter 638 and a start address 640. Also included in background module 604 is an LFSR PSA implementation 642, a PSA reference register 644 and a PSA compare logic 646.

Foreground mode module 602 and background mode module 600 are coupled to flip flops 648. Flip flops 648 may couple various signals to the main control CPU or an external fault pin. The flip flop 648 may include a foreground PSA interrupt, a foreground signature fault register, a background PSA interrupt and a background signature fault register. The operation of the various circuits within foreground module and background module will become more evident with respect to the following description. The PSA mode control logic 606 controls various read write signals reset signals and various control signals to foreground mode module and background mode module. The PSA mode module logic circuit 606 also has foreground chip select foreground mode enable background chip select and background mode enable outputs. These control various operations of foreground mode module 602 and background mode module 604.

Referring now to FIG. 6, a method for determining the health of a CPU by checking the contents of the memory is illustrated. The following chart lists the variables and a definition used in the following flow chart:

| | |
|---|---|
| PSAADRPTR | Address Counter/pointer Points to address of memory to be included in signature |
| PSAENDADDR | End Address, value dependent size on memory under test |
| PSAREFREG | PSA Reference register, contains pre-calculated signature for Memory under test |
| PSABLKMEMCNT | Block memory counter. Indicates which block of memory is currently being signatured. Used by PSA Mode Control Module in Pre-Init mode (and in normal background mode. |
| PSACPUBSYCYC | PSA, "CPU" Busy Cycle Counter, monitors status of CPU, PSA determines the number of consecutive cycles that the CPU is busy |
| PSATCCBSY | CPU busy cycle counter for the Total cycle counter. |
| PSALFSR | LFSR Register, parallel mode accumulator |
| PSASFLT | PSA Signature Fault |
| PSATCC | PSA Total Cycle Counter |

Status Register Flags:

| Status Register Flags: | |
|---|---|
| PSATCCCLRFLG | 1 = Both blocks of Memory have been signatured |
| PSAERRINTFLG | 1 = Signature Fault, enables dumping of internal registers |
| SFLT | = Signature Fault register value |
| PSAERRINTFLGMASK | 1 = interrupts Masked 0 = interrupts Enabled |
| PSAENABLE Constants | 1 = ENABLE 0 = DISABLE |
| MAXBSYCYC | Maximum Number of busy cycles specified as acceptable by system |
| x | Number of Memory Blocks (Static) under test |

For the following example, it is presumed that if the Parallel Signature Analysis (PSA) system is to work in background mode, the system must be able to either detect when the CPU has an idle cycle, force an idle cycle or stall the CPU. Of course, the system may be configured to work in a foreground mode as well.

In step 140, the hardware is started. In step 142, the MCU is started. In step 144, the hardware clocks and reset conditions must be allowed to stabilize to prevent transient errors. This method preferably accumulates data memory in background mode during free cycles. In step 146, a signature fault flag is set to zero. In step 148, the parallel signature analysis is enabled. In step 150, interrupt mask is set. This signal is used to prevent PSA from accumulating data if an interrupt occurs.

An optional step, step 152 may be performed. Step 152 stalls the CPU to prevent further action by CPU. The ability to stall the CPU is dependent on the type of CPU. This prevents application software from running during the initialization process.

In step 154, the system is initiated to a start block address by and address block pointer (PSABLKPTR) for testing memory. The PSA address pointer (PSAADRPTR) is used to step through address locations. In step 156, data at the address block pointer is read into a total cycle counter reference register. This indicates the total number of LFSR accumulation cycles required to complete the validation of all memory blocks to be checked. In step 158, the PSA enable flag is checked to determine whether the system is enabled (1) or disabled (0). If the system is disabled, step 158 is repeated until the system is enabled. If the system is enabled, step 160 sets the block memory counter to zero. In step 162, the block pointer is initialized to the start address block plus four (four bytes/or two words). In step 164, the clear flag is set to "1" to initiate the clearing of the PSA total cycle counter.

In step 166, the data at the block pointer is read into address register and the block pointer is incremented by two (two bytes/one word). In step 168, the end address is read into end address counter, and the block pointer is incremented by two. In step 170, the PSA reference signature is stored in PSA reference register. This is used to initialize the LFSR. The block pointer is then incremented by four. In step 172, a seed value is inserted into the LFSR.

In step 174, the CPU busy cycle bus counter is cleared. In step 176, the PSA enable bit is checked. If the PSA enable bit is disabled, step 158 is executed. If the PSA is enabled, step 178 is executed.

In step 178, the cycle count is compared to the maximum number of busy cycles acceptable by the system. In step 178, if the CPU busy cycles do not equal or exceed the maximum busy cycles allowed by the system, step 180 is executed. In step 180, if the PSA mode control does not detect that the CPU is idle, then step 182 is executed. That is, if the CPU is accessing or actively driving the, then step 182 is executed. In step 182, the PSA CPU busy cycle counter is incremented by one. After step 182, step 178 is again executed.

Returning now to step 178, if the busy cycle counter equals or exceeds the maximum busy cycle counter set by the software, step 184 is executed. In step 184, PSA mode control forces a CPU idle bus cycle.

At step 184 PSA mode control forces an idle bus cycle (stealing bus cycles) then step 186 is executed. In step 186, the data from the address pointer (PSAADRPTR) location is placed into the LFSR. Step 188 is then executed. If the address pointer is less than the end address, step 190 is executed. This indicates that all of the data has not been accumulated by the LFSR. In step 190, the address pointer is incremented and the program is cycled to step 174. In step 188, if the address pointer is not less than the end address, step 192 is executed.

In step 192, if the reference register is not equal to the LFSR data calculated from the address information, step 194 forces a signature fault and step 196 releases the CPU if the CPU is in the stalled state. In step 192, if the PSA reference register is equal to the data in the LFSR, step 198 is executed. In this mode, the LFSR is initialized for the next address range. In step 198, the next address block is incremented. In step 200, if the next address block is less than X, where X is the number of memory blocks under test, then testing of the address block continues at step 166. If the next address block is not less than X in step 200, step 202 is executed which releases the CPU if the CPU is in the stall state. After step 202, step 158 is again executed.

Referring back to step 192, if the PSA reference register is not equal to the LFSR register steps 194 and 196 may be bypassed and optional steps 204 through 210 may be executed. In step 204, a signature fault is forced by the system. This may be accomplished by forcing an error pin to the low state. This, for example, would inhibit output functions but keep the CPU and signature module active. To keep the CPU active, step 206 would release the CPU if the CPU is in a stall state. In step 208, the PSA error interrupt flag is set to logic level one. This will cause an interrupt to occur. The interrupt service routine will interrogate the internal registers of the PSA module, further, the interrupt service routine can be used to interrogate the status of the Dual CPU system registers. In step 210 the PSA is disabled so that the values in the internal registers are no longer updated after the first fault. This will freeze the contents of the PSA so that the internal registers can be read at any time or moved to nonvolatile memory, until the next reset, such as when the ignition is started or power is interrupted and reapplied to the PSA module. After step 210, step 158 is again executed.

Referring back to step 140, after hardware power, a parallel process to steps 142 through 210 may be executed simultaneously. The parallel method provides an independent redundant check of the PSA module to prevent fault masking. The following steps prevent the PSA from not completing its task within a maximum allowable total cycle count limit.

In step 214, the total cycle count reference register is set to a "seed" value, this value is initialized in step 156. The seed value corresponds to the maximum count needed to signature memory. In step 216, the PSA enable flag is checked to see if the PSA is enabled or disabled. If the PSA is disabled, step 216 will repeat. If the PSA is enabled, step 218 sets the PSA total cycle counter to zero. In step 220, the PSA total cycle clear flag is set to zero.

In step 222, the PSA total cycle clear flag is compared to zero. If the total cycle clear flag is not equal to zero, step 218 is then executed. If the total cycle clear flag is equal to zero, step 224 is executed. In step 224, the PSA total cycle counter busy is set to zero. In step 226, the PSA enable bit is checked to determine if the PSA is disabled or enabled. If the PSA is disabled, step 216 is executed. If the PSA is enabled, step 228 checks to see whether the PSA total cycle counter busy is greater than or equal to the maximum number of busy cycles specified as acceptable by the system. If the maximum number of busy cycles is not exceeded, step 230 determines whether the CPU is accessing or actively driving the bus. If the bus is not idle, the cycle busy counter is incremented into step 232. Then step 228 is again executed.

If, in step 230, the bus is idle or in step 228, if the PSA total cycle busy exceeds the maximum busy cycles, step 234 is executed. In step 234, the total cycle counter is incremented. In step 236, the total cycle counter is checked to determine whether it equals or exceeds the total cycle count reference register. If the total cycle counter does not exceed or equal the total cycle count reference register, step 222 is executed. If the PSA total cycle counter exceeds or is equal to the total cycle count reference register, step 238 is executed. If the total cycle counter is greater than the total cycle count reference register, then a total cycle limit fault has occurred. In step 238 of FIG. 6D, the CPU, if stalled, is released. In step 240, a signature fault is initiated indicating a fault. After step 240, step 216 is executed.

Figure 6A:
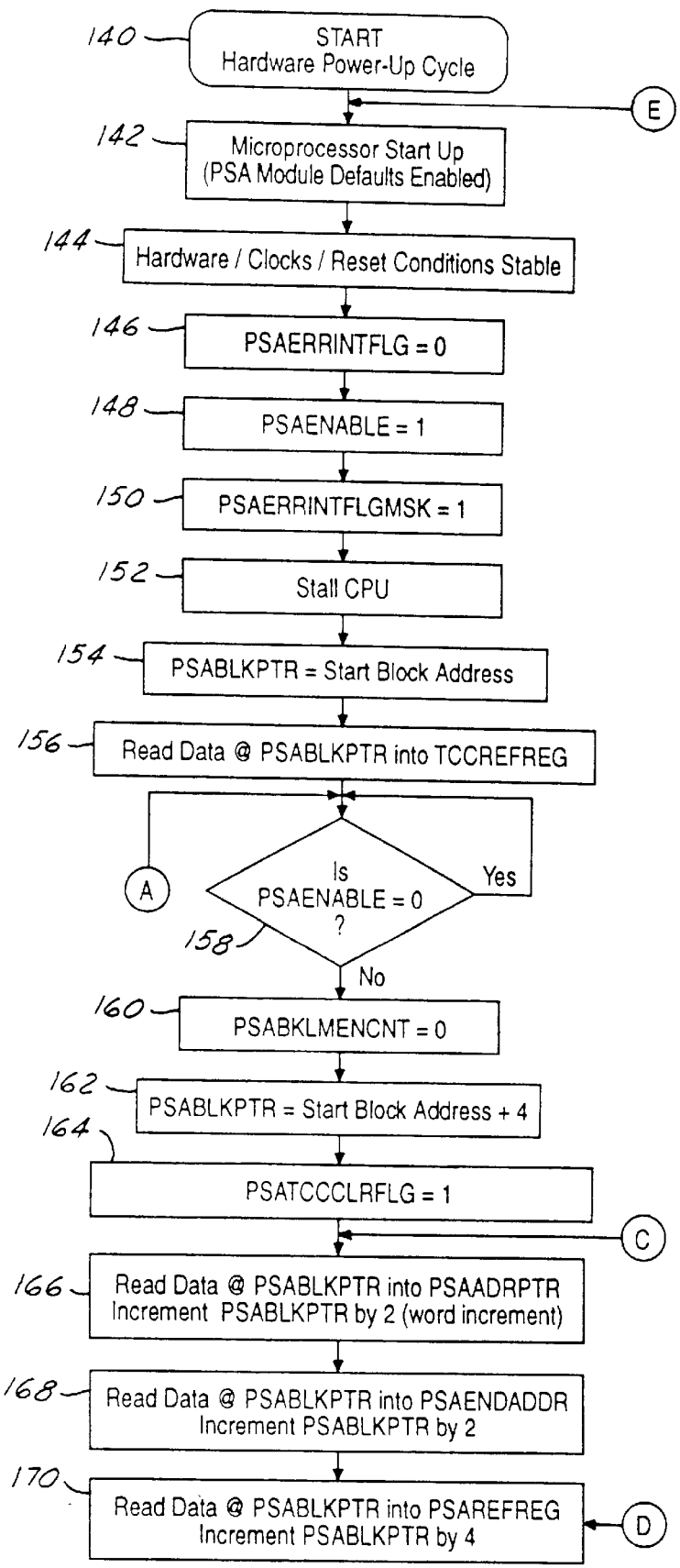
FIGS. 6A–6E is a flow chart of the memory checking operation of a system according to the present invention.
Figure 6B:
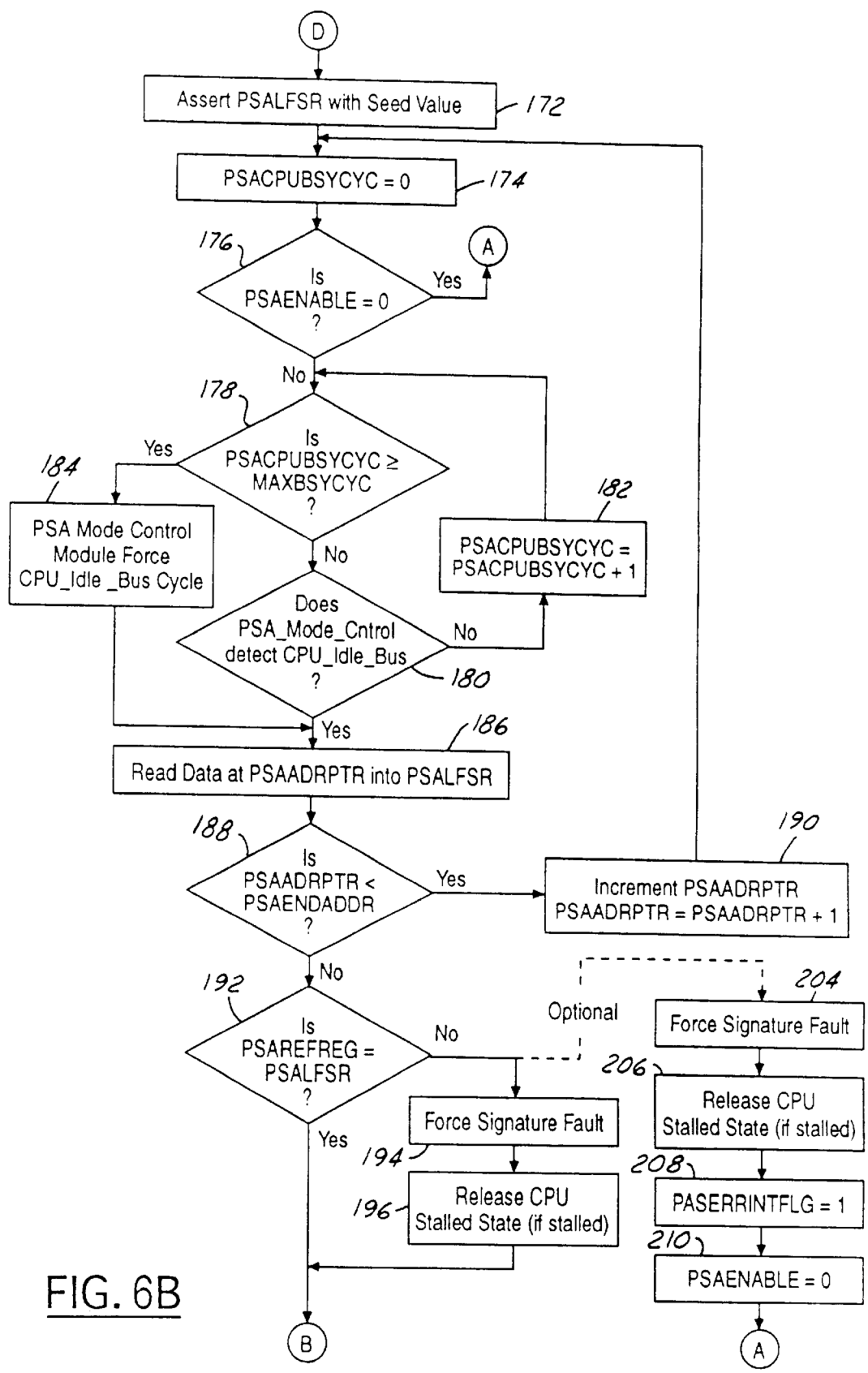
Figure 6C:
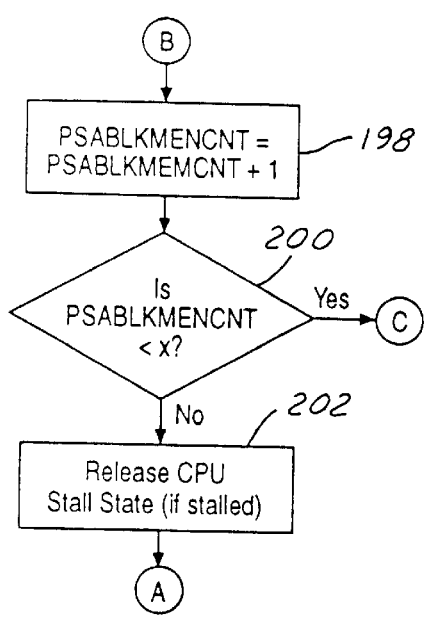
Figure 6D:
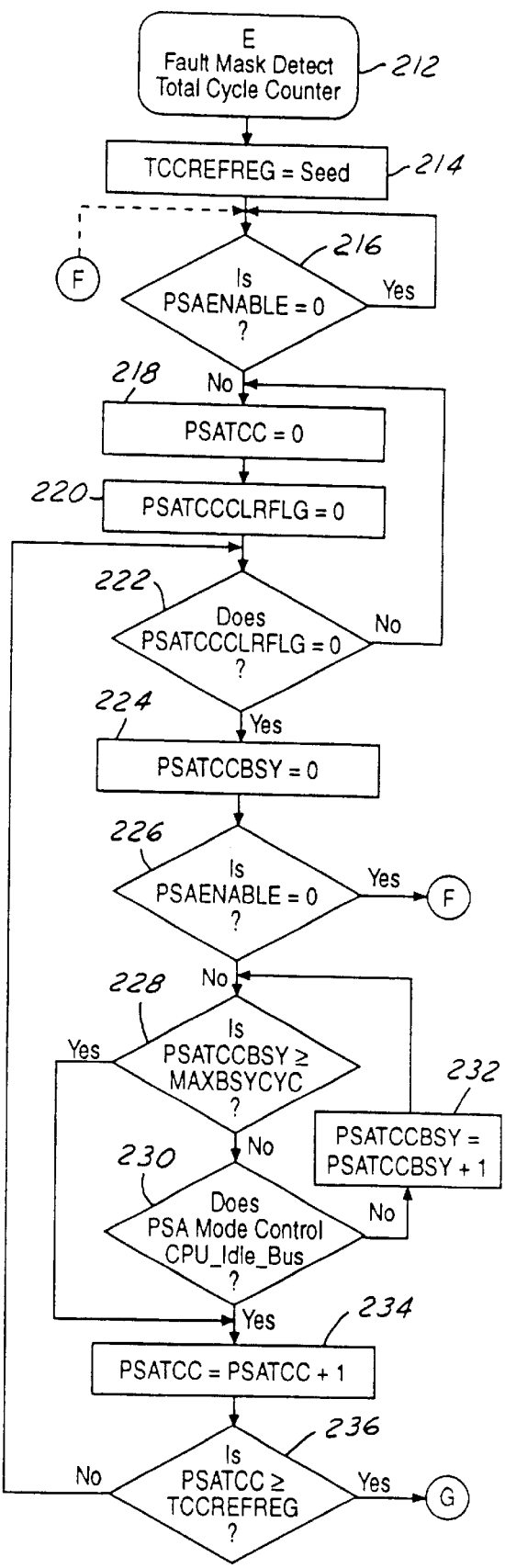
Figure 6E:
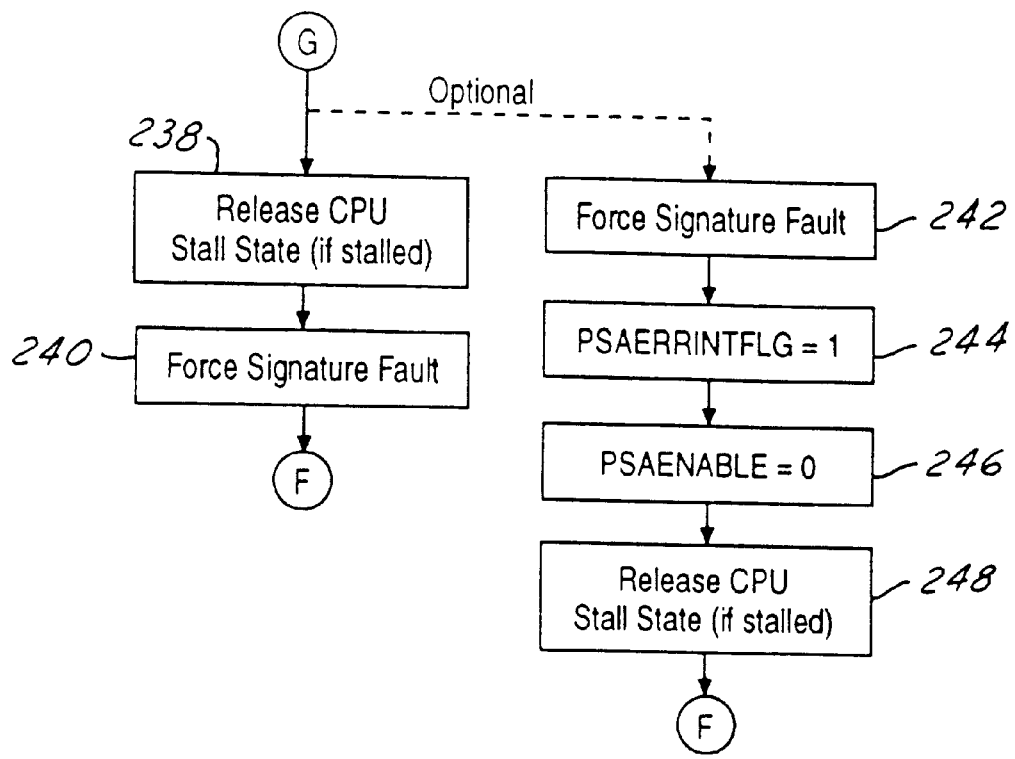

The only way to prevent a Total Cycle Count Fault and exit out of loop 222 through 236 of FIG. 6D, is for step 202 of FIG. 6C (LFSR accumulation loop) to be reached (all of the memory has been checked) with out a failure (correct signature test in FIG. 6B step 192). This will return to entry point A of FIG. 6A. Referring to FIG. 6A step 164, the PSATCCCLRFLG is set to one. In FIG. 6D (Total Cycle Counter flow chart), in step 222 if PSATCCCLRFLG=1, then step 218 is executed and the PSA total cycle counter (PSATCC) will be reset to zero. Hence the process repeats.

Referring back to step 236 of FIG. 6D, if the PSA total cycle counter is greater than or equal to the total cycle reference register, an optional routine starting with step 242 may be executed. In step 242, the signature fault is indicated. For example, a signature error pin may be set to allow the CPU and signature module to be active but would inhibit output functions. In step 244, the PSA error interrupt flag may be tied to an interrupt and the internal registers of the PSA modules and the Dual CPU system memory and or registers may be stored in non-volatile memory area by the interrupt service routine. In step 246, the PSA enable flag may be set to disable the PSA. This suspends the LFSR accumulation, FIG. 6A step 158, and the Total Cycle Counter. FIG. 6D step 216. This will allow the values of the internal registers to be captured and retained from the result of the detection of the first fault. The registers can be read for later analysis at any time, or until a reset occurs. In step 248, if the CPU is in the stalled state, after step 248, the CPU will be released and step 216 will be executed.

Figure 7A:
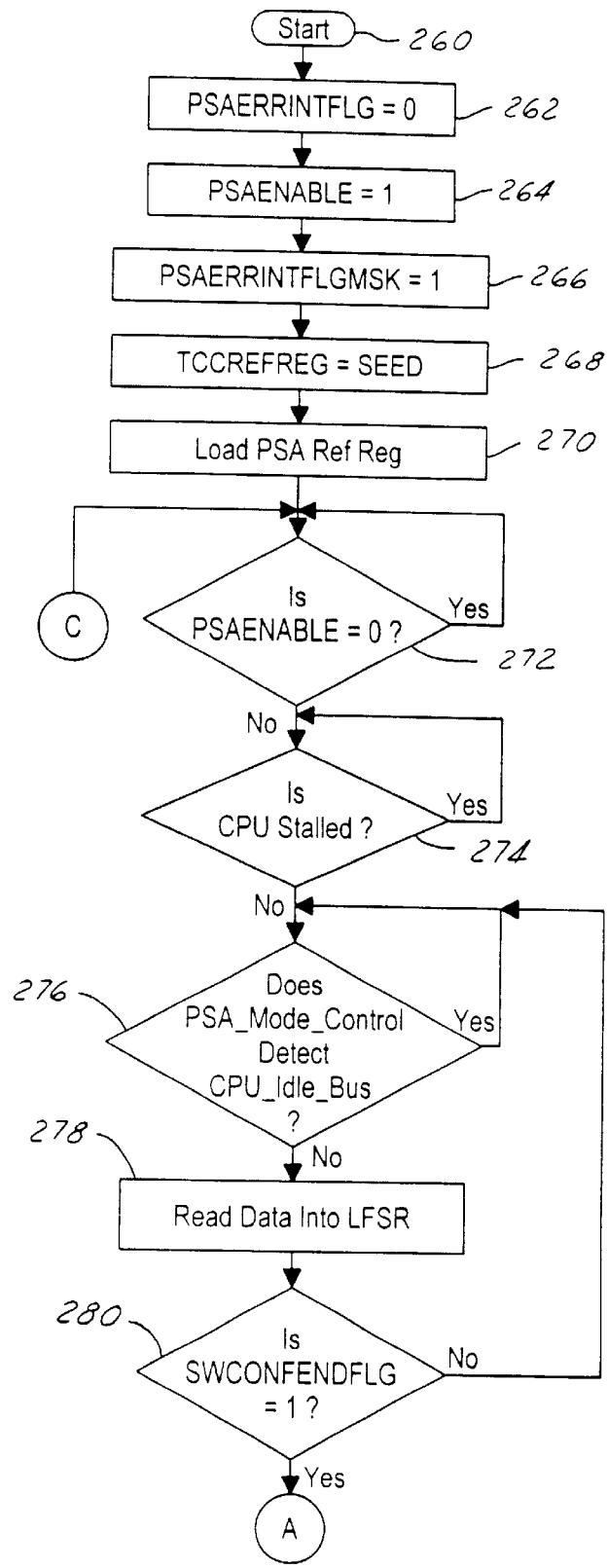
FIGS. 7A–7B is a flow chart of the operation of a data and instruction stream analyzer according to the present invention.
Figure 7B:
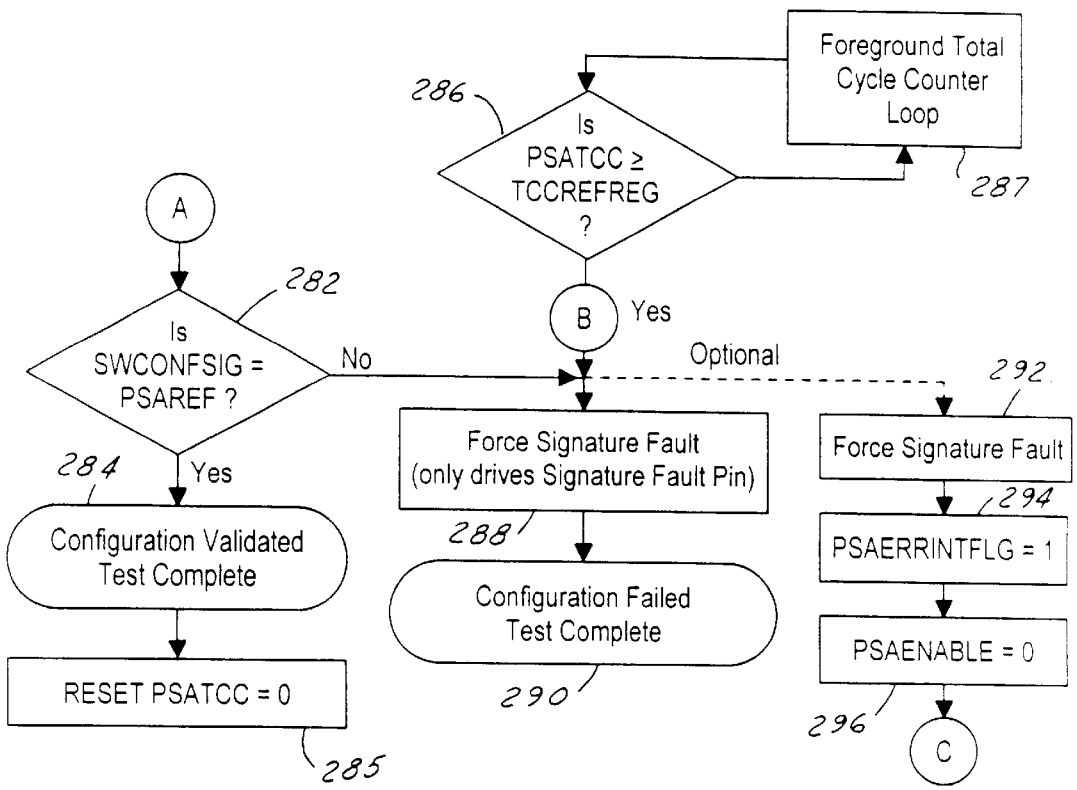

Referring now to FIG. 7A, the above operation may be modified to check data streams and instructions streams through the signaturing process. This method is particularly useful for determining the health of the CPU on startup after initialization. Similar variables as in the above method are used for simplicity.

In step 260, the hardware process is started. In step 262, a signature fault flag is set to zero. In step 264, the parallel signature analysis is enabled. In step 266, interrupt mask is enabled to prevent any interrupts from stopping the PSA. In step 268, the total cycle counter is set to a seed value in step 268. The total cycle counter may be used from the process described in FIG. 5 above.

In steps 270, the parallel signature analysis reference register is loaded. In step 272, the PSA enable flag is checked to determine whether the system is enabled (1) or disabled (0). If this system is disabled, step 272 is repeated until the system is enabled. If this system, enabled, step 274 checks to determine- whether the CPU is stalled. This step may be eliminated in various implementations. If the CPU is stalled, step 274 is repeated. If the CPU is not stalled, step 276 determines whether the CPU is accessing or actively driving the bus. If the bus is idle, step 276 is repeated. If the bus is not idle, step 278 is executed. In step 278, the aggregate of the instruction and the data streams that are used to configure the imbedded controller in the real-time are input to the LFSR. In step 280, the software configuration end flag is checked to determine whether the initialization or configuration phase is over. This is used because only the end LFSR value is compared to the PSA reference register. A software configure end flag of 1 indicates that the final signature is available. If the final signature is available in step 280, step 282 compares the PSA reference value to the end value SWCONFSIG. If the values are equal, step 284 indicates that a valid configuration test is completed. Step 285 resets the total cycle counter to zero.

Returning back to step 280, if the software configuration end flag is not 1, indicating that the initialization or configuration phase is over, step 276 is again executed. If the SWCONFIG is equal to the PSAREF, step 288 is executed. Step 288 forces a signal fault to be indicated. In step 290, an indication is provided that the configuration failed and the test is complete. Step 288 is also executed if step 282 indicates that the PSA reference register is not equal to the final obtained PSA value.

A parallel loop to step 262–282 is illustrated by step 286, the PSA total cycle counter is checked to determine whether it is greater than the total cycle reference register. If the PSA total cycle counter is not greater than the total cycle reference register, step 287 is executed. Step 287 corresponds similarly in function to FIG. 6D. If the total cycle count becomes greater than the total cycle reference register value, steps 283 or 292 are executed.

Referring back to step 282, an optional set of steps may be implemented if SWCONFIG is not equal to PSA reference generated. In step 292, a signature fault would be forced. This would drive the signature error pin low. The signature error pin would then be connected to the enable pin inputs of the peripheral output drivers of the ECU. This would inhibit output functions but keep the CPU and signature module active. In step 294, interrupt flag would be set to 1. The interrupt service routine could store the internal registers of the PSA module and the Dual CPU system to non-volatile memory for diagnostic purposes. In step 296, the PSA enable bit would be set to 0 thus disabling the PSA so the values of the internal registers would be captured at the first detected fault and could be read for analysis. The internal PSA registers would be valid and readable by a communication link until the next reset or ignition/start/power cycle occurs.

Figure 8A:
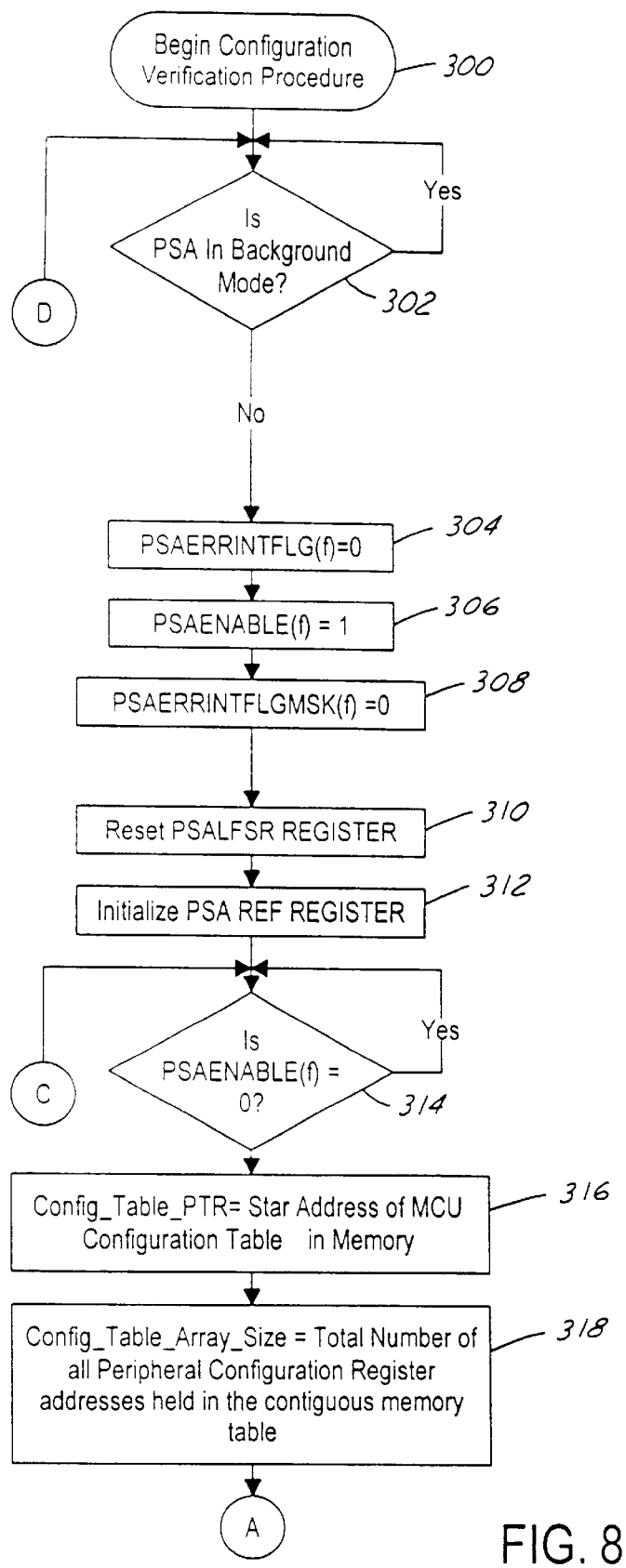
FIGS. 8A–8C is a flow chart of the operation of a data stream analyzer according to the present invention.
Figure 8B:
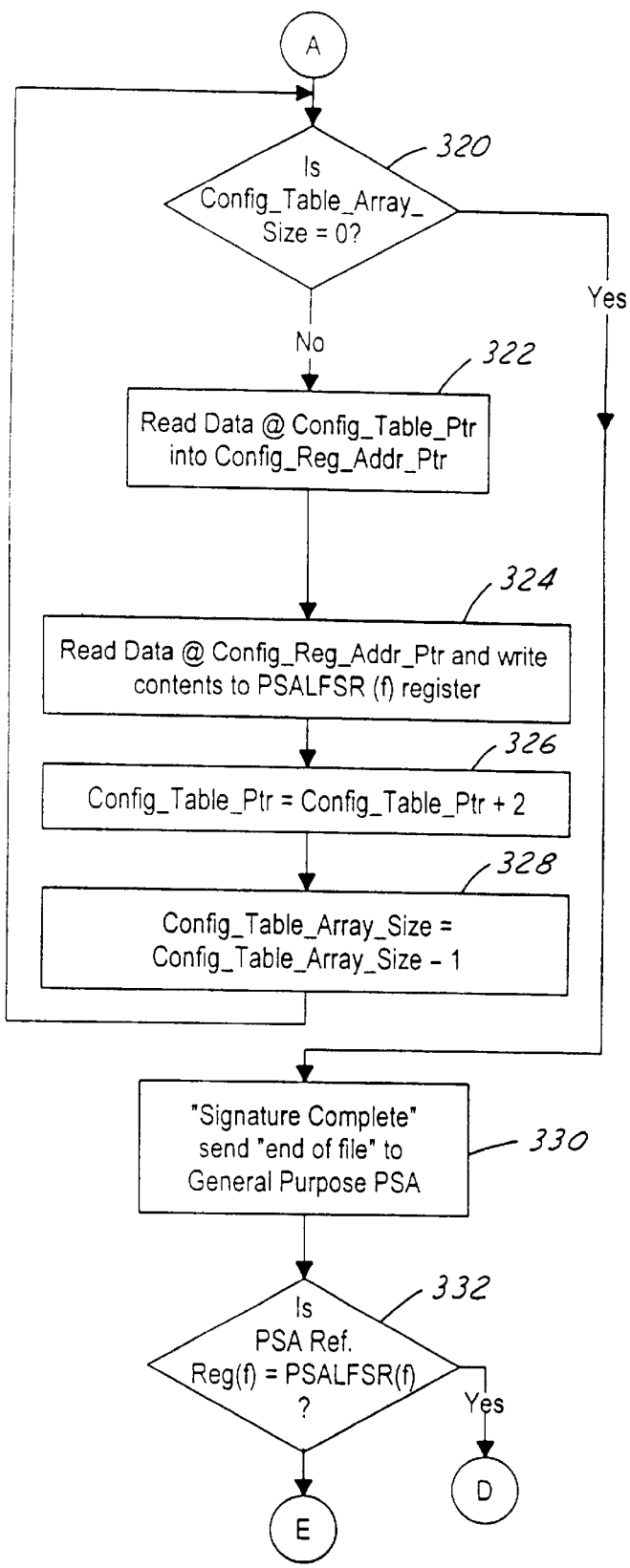
Figure 8C:
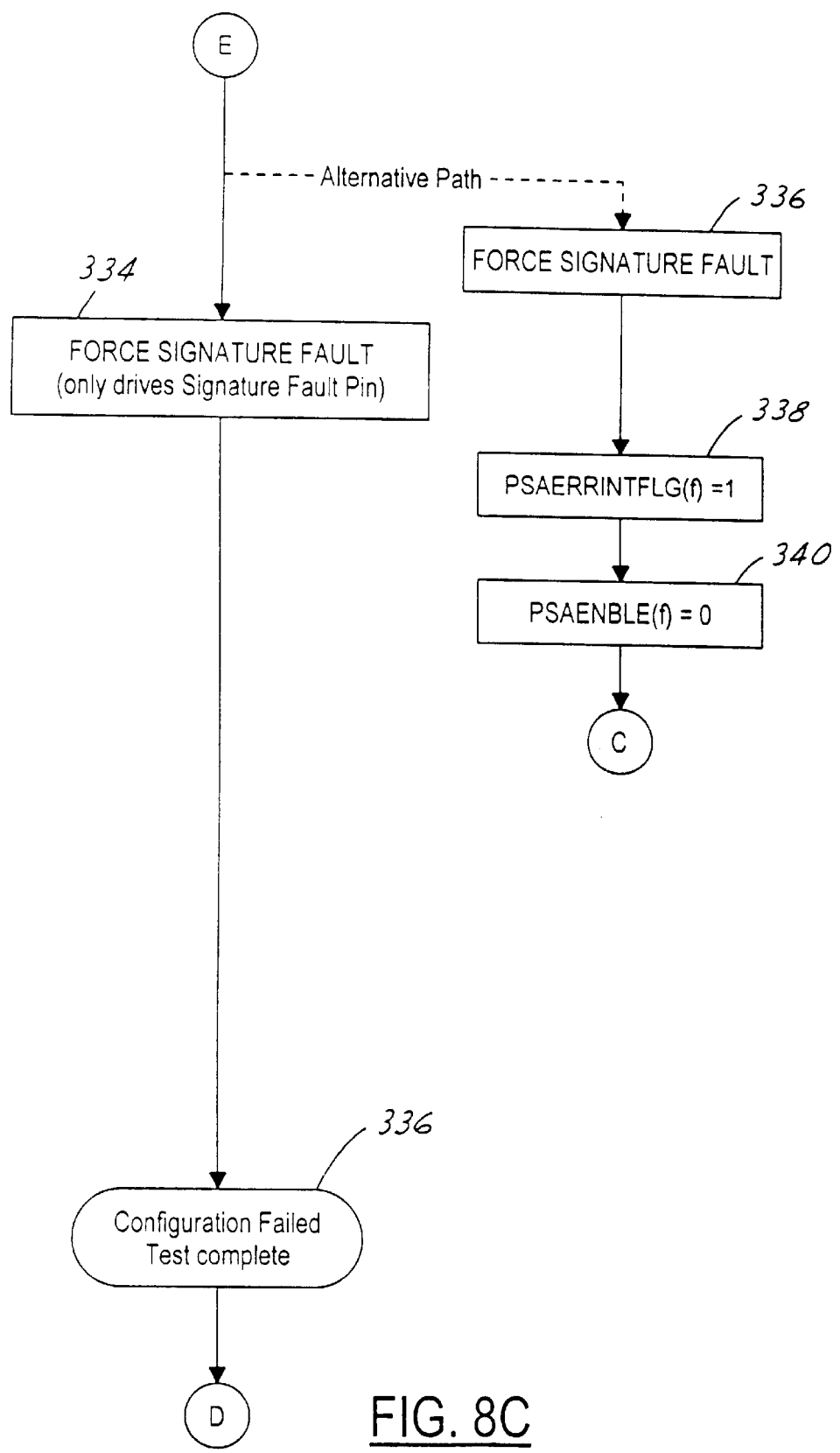

Referring now to FIG. 8A, the above routines may also be modified to signature data streams at anytime. The following description is particularly useful while an application is running on the CPU. Similar variables as in the above methods are used for simplicity.

In step 300, the hardware process is started. In step 302 the PSA is checked to see if it is in backgound mode. If the PSA is in background mode, step 302 is repeated. If the PSA is in foreground mode (not in background mode, step 304 is executed. In step 304, a signature fault flag is set to zero. In step 306, the parallel signature analysis is enabled. In step 308, interrupt mask is lowered or cleared.

In contrast to the example above, DMA transfers, system interrupts, etc., are not required to be blocked. In this embodiment, data is written directly to the PSA LFSR register. In step 310, the PSALFSR register is reset. In step 312, a calibration value is loaded into the register by the application software.

In step 314, the PSA enable flag is checked to determine whether the system is enabled (1) or disabled (0). If this system is disabled, step 314 is repeated until the system is enabled. If in step 314, the PSA is enabled, i.e., a logic level one, step 316 is executed. In step 316, the configuration table pointer (config_table_PTR)is set to the start address of the MCU configuration table in memory. The configuration table is a non-continuous memory block that contains the contiguous addresses of the MCU peripheral configuration registers. In step 318, the configuration table array size is set to the total number of all of the peripheral configuration register addresses held in a contiguous memory table. This is used to keep track of when all the configuration values held in addresses have been accounted for and signatured in the LFSR. In step 320, the configuration of table size is determined as zero. When the configuration table array size is zero, then all of the MCU peripheral registers that are desired to be checked have been scanned into the LSFR. If all of the registers have not been scanned, step 322 is executed. In step 322, the data at configuration table pointer is loaded into the LSFR. In step 324, configuration data is written into the LSFR for signature accumulation. In step 326, the next peripheral configuration register is obtained. The increase of two bites is shown since every address represents two bites of data. In step 328, the configuration array sizes detrimented by one. This allows the next peripheral configuration register to be obtained. After step 328, step 320 is again performed. If in step 320 the end of the configuration table size is zero, then step 330 is executed. In step 330, each of the registers has been completed. An end of file may be sent to the PSA. In step 332, if the PSA reference register is equal to the PSA LSFR value, then the signature is the proper signature. Step 302 is then executed which again sets the system up for a next set of evaluations.

In step 332, if the PSA reference register is not equal to the value set in PSA LSFR, then step 334 is executed which forces a signature fault to be set. In step 336, a "B" system indicates that the configuration failed and the test is complete. This may allow a signature fault pin to be in the low state for example. In this manner, the system would still remain active. An alternative path from steps 334 and 336 may also be executed.

In step 336, a signature error pin may be set to the low value. A signature error pin may be connected to enable pin inputs of peripheral output drivers of the control unit. This would inhibit output functions but keep the CPU and signature module active. In step 338, the PSA error interrupt flag may be set to a value indicating an error. In step 340, the PSA enable may be set to zero, which disables the PSA. This allows the values in the internal registers to be read for analysis. This also freezes the contents of the internal registers of the foreground mode. These values may be placed in an area for communication purposes. For example, the values may be placed in a double EE PROM for a non-volatile storage. After step 340, step 314 may again be executed and keep the system active. In step 314, the system would be again initialized and the system configuration check would be continued.

While the best mode for carrying out the present event has been described in detail, those familiar with the art to which this invention relates will recognize various alternative designs and embodiments for practicing the invention as defined by the following claims:

What is claimed is:

1. A circuit comprising:
   a bus having a data line and instruction line;
   a firs t CPU coupled to the bus;
   a reference memory storing a reference signature;
   a shift register coupled to the bus, generating a second signature in response to said data line and instruction line; and
   a controller coupled to the register and said reference memory for controlling reading of said data line and instruction line, said controller being adapted to disable at least one interrupt source and enable a signature ready interrupt, to execute an interrupt service routine to obtain the second signature, compare said reference signature to said second signature, and to generate a fault signal when the reference signature is unequal to the second signature.

2. A circuit as recited in claim 1 further comprising a total cycle counter coupled to the controller.

3. A circuit as recited in claim 1 wherein said shift register comprises a linear feedback shift register.

4. A circuit as recited in claim 1 wherein said first register is comprised of a first data register coupled to said bus, and a control register coupled to said bus.

5. A circuit as recited in claim 1 further comprising a second data register coupled to said bus.

6. A circuit as recited in claim 1 further comprising a plurality of feedback register stages coupled to said first register, said second register and said control register.

7. A circuit as recited in claim 1 further comprising a second CPU coupled to the bus.

8. A circuit as recited in claim 1 further comprising an isolation gate coupled to said bus between said first CPU and said second CPU.

9. A standalone self test module comprising:
   a bus having a control line having instructions thereon, and a data bus having data thereon;
   a linear feedback shift register coupled to said bus, said linear feedback shift register generating a signature in response to said instructions and said data;
   a bus control logic circuit coupled to the control and coupled to the shift register for controlling reading of said data and instruction, said control logic circuit being adapted to disable at least one interrupt source and enable a signature ready interrupt, to execute an interrupt service routine to obtain a second signature and compare said reference signature and said second signature, and to generate a fault signal when the reference signature is unequal to the second signature.

10. A circuit as recited in claim 9 further comprising a total cycle counter coupled to the bus control logic.

11. A circuit as recited in claim 9 wherein said register is comprised of a first data register coupled to said bus, and control register coupled to said bus.

12. A circuit as recited in claim 9 further comprising a second data register coupled to said bus.

13. A circuit as recited in claim 9 further comprising a plurality of feedback register stages coupled to said first register, said second register and said control register.

14. A circuit as recited in claim 9 further comprising an isolation gate coupled to said bus between said first CPU and said second CPU.

15. A method of validating the operation of a microcontroller unit during initialization, said method comprising the steps of:
   storing a reference signature in a memory;
   retrieving the reference signature from memory;
   executing a pre-initialization routine;
   disabling all interrupt sources;
   enabling a signature ready interrupt;
   executing an interrupt service routine to obtain a second signature;

comparing the reference signature to the second signature to obtain a comparison; and, indicating a fault in response to the comparison.

16. A method as recited in claim 15 wherein the step of executing an interrupt service routine comprises the step of obtaining a pre-initialization signature through a linear feedback shift register.

17. A method as recited in claim 15 wherein the steps of obtaining a pre-initialization signature comprises the steps of non-intrusively accumulating data and instructions to a linear feedback shift register.

18. A method as recited in claim 15 wherein the step of comparing comprises the step of comparing the reference signature to the pre-initialization signature.

19. A method as recited in claim 15 wherein the step of wherein the step of retrieving the reference signature from memory comprises the step of retrieving the reference signature from a memory block adjacent to the tested memory block.

20. A method as recited in claim 15 wherein the step of wherein the steps of occur in a foreground mode.

* * * * *